O. BRIZENDINE.
RESILIENT WHEEL FOR VEHICLES.
APPLICATION FILED MAY 23, 1916.
1,243,804.
Patented Oct. 23, 1917.
2 SHEETS—SHEET 1.
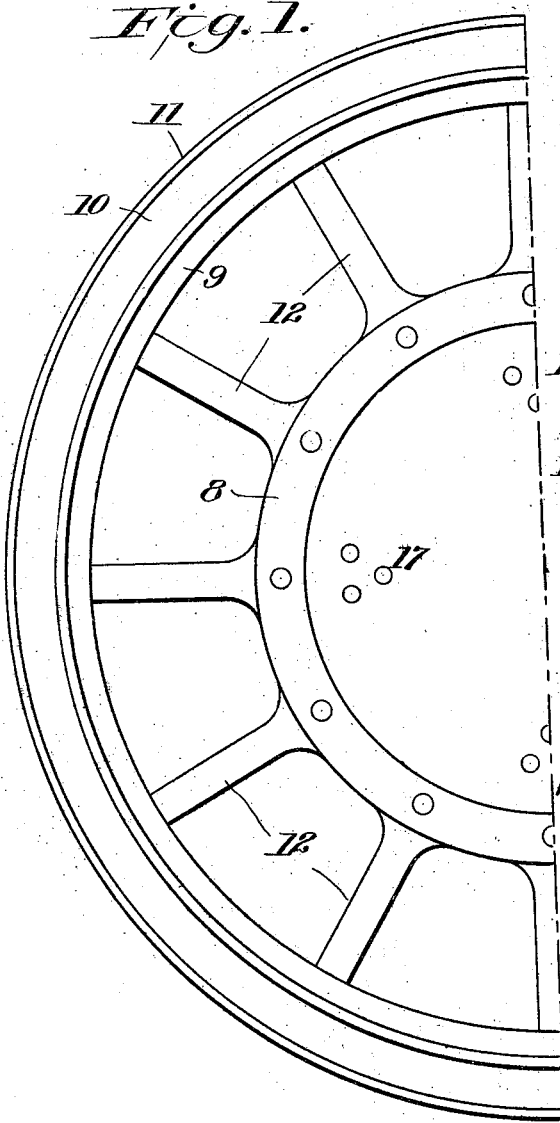
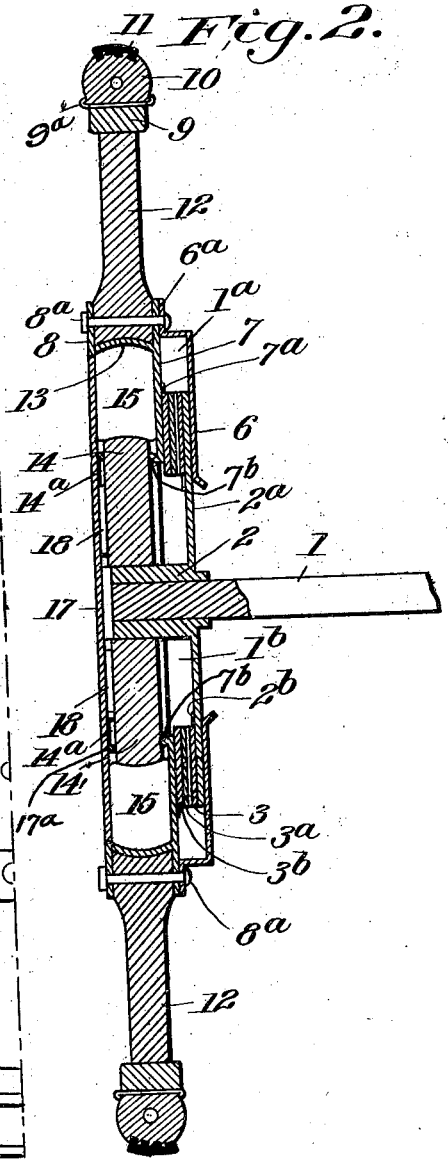
Inventor
Olie Brizendine
By E.B.Clark
Attorney

O. BRIZENDINE.
RESILIENT WHEEL FOR VEHICLES.
APPLICATION FILED MAY 23, 1916.

1,243,804.

Patented Oct. 23, 1917.
2 SHEETS—SHEET 2.

Inventor
Olie Brizendine
By E. H. Clark
Attorney

UNITED STATES PATENT OFFICE.

OLIE BRIZENDINE, OF MIAMI, TEXAS.

RESILIENT WHEEL FOR VEHICLES.

1,243,804.

Specification of Letters Patent.

Patented Oct. 23, 1917.

Application filed May 23, 1916. Serial No. 99,385.

*To all whom it may concern:*

Be it known that I, OLIE BRIZENDINE, a citizen of the United States, residing at Miami, in the county of Roberts and State of Texas, have invented certain new and useful Improvements in Resilient Wheels for Vehicles, of which the following is a specification.

This invention relates to a resilient wheel for vehicles of that kind in which a cushioned and floating hub is connected or locked to a fixed inner rim by means of interlocking sliding members permitting free radial movement of the hub and rim with relation to each other, but preventing either from turning in relation to the other.

The principal object of my invention is to provide in connection with a floating hub, pneumatic cushion devices bearing on a fixed inner rim, and positive-drive connections between the hub and rim, comprising two or more disks or annular plates having radial interlocking keys or tongues and key-seats or grooves for permitting radial movement of the hub with relation to the rim but causing said parts to turn together.

Another object is to provide for causing a floating hub to uniformly bear upon and compress interior pneumatic cushion devices through the medium of radially movable blocks interposed between the hub and said pneumatic cushion devices for obtaining a cushion effect without the use of a pneumatic tire usually employed for this purpose.

Another object is to provide for uniformly distributing the pressure of a floating hub at all points on cushioning devices within a rim to which the spokes are attached and to connect said hub with the rim by means of interlocking sliding members for providing ease and resilience of movement without a pneumatic tire.

Other objects and purposes of my invention will appear in the detail description of the wheel.

The matter constituting my invention will be defined in the claims.

I will now describe the details of construction by reference to the accompanying drawings, in which—

Figure 1 represents an elevation of one-half of the outer face of a wheel.

Fig. 2 represents a transverse section of my improved wheel.

Fig. 3 represents a perspective transverse section of a solid wooden tire, in enlarged scale.

Figure 4:
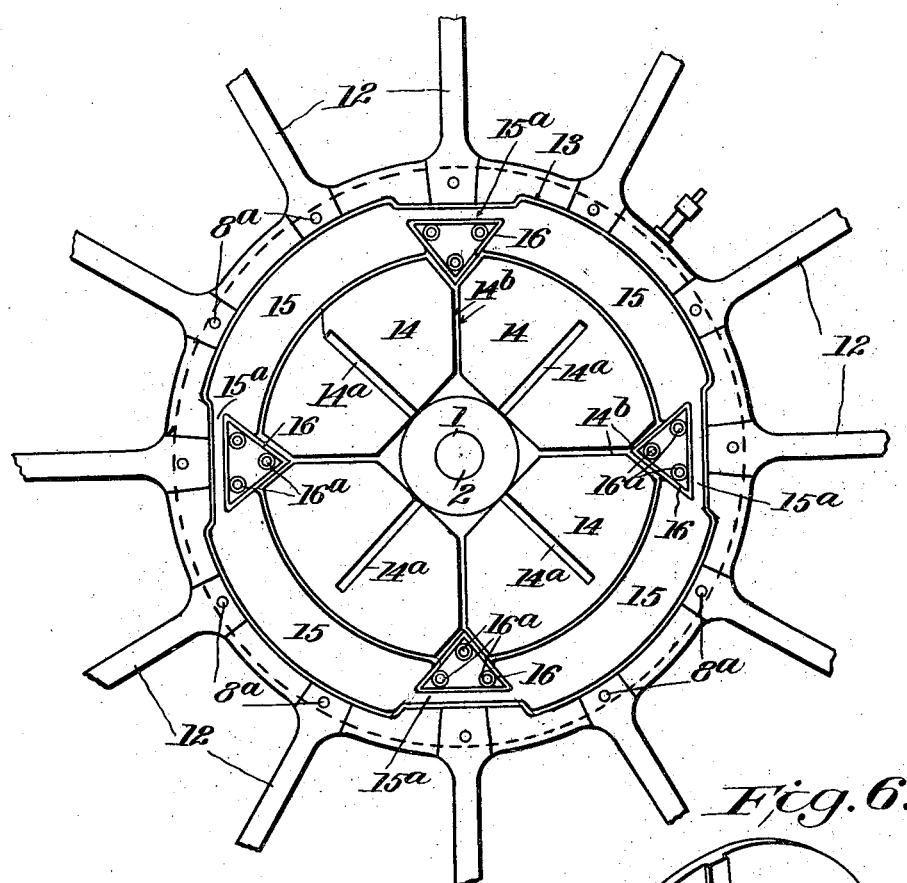
Fig. 4 represents the outer face view of the hub portion, on enlarged scale and with the outer cover plate removed.
Figure 5:
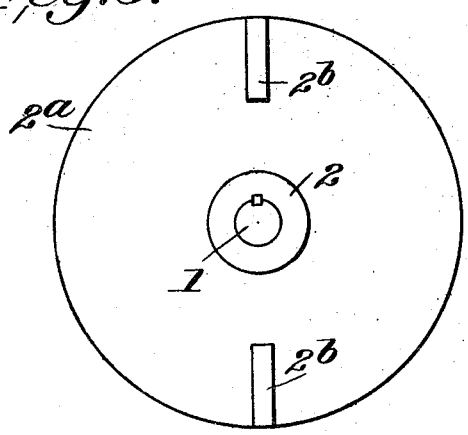
Fig. 5 represents an inner face view of the main disk.
Figure 6:
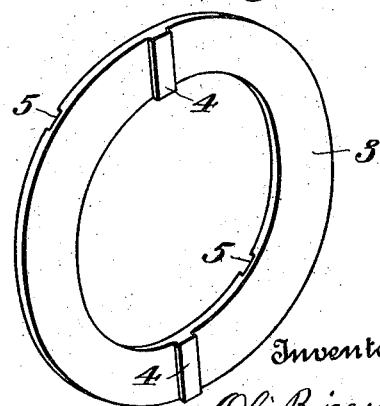
Fig. 6 represents a perspective view of one of the movable disks having tongues and grooves.

In the construction of my resilient wheel for automobiles and the like I provide interior pneumatic cushion devices bearing at their outer surfaces on an inner rim to which the inner ends of the spokes are attached, and within such cushion devices I provide radially movable segmental blocks bearing at their arc-shaped outer edges on the cushions and at their inner edges on a floating hub and axle. The hub-sleeve is connected to the fixed rim through the medium of interlocking radially sliding members comprising annular disks or plates having interlocking radial keys or tongues and key-seats or grooves which permit free radial movement of the hub with relation to the rim and against the cushion devices, but at the same time cause said parts to turn together. Means are also provided for causing the segmental blocks to move outward and inward in radial lines so as to press uniformly on the cushion devices. In this construction the cushion devices are protected from excessive wear or strain and they provide the desired resilience to overcome jar and jolt and permit the use of a solid tire which is not subject to puncture or undue wear. I also provide in connection with the above principal parts, certain details of construction which will now be made clear by a description referring by numerals particularly to the drawings.

To the axle 1 is keyed a hub-sleeve 2 having rigidly secured to its inner end a main disk 2ª, the arrangement being such as to form a chamber 1ª between it and the main parts of the wheel. Within this chamber are placed the radially movable and interlocking annular disks 3, 3ª, 3ᵇ, providing a circular chamber or space 1ᵇ between their inner edges and the hub 2, in which the latter can freely move in any radial direction. A concave annular housing plate 6, having an outer flange 6ª, and a main annular inner plate 7 are secured by bolts 8ª to a narrow annular rim plate 8 on the outer face of the wheel. The bolts 8ª also pass through the inner ends of the spokes 12 and hold them in place. The flange 6ª, the band 13, and the annular plate 8 form the inner-fixed rim of the wheel. The band 13 is preferably curved transversely and forms a bearing for the outer faces of the pneumatic cushions 15. The main disk 2ª has a plain smooth outer surface, over which the annular housing 6 can freely move as the hub is forced into different positions with respect to the wheel when the vehicle is in motion. This housing, in connection with disk 2ª, forms a closed chamber 1ª for excluding dust from the interlocking disks and inner face of the wheel.

For the purpose of connecting the hub-sleeve with the wheel, I preferably use three interlocking radially sliding disks 3, 3ª, 3ᵇ in connection with the outer main disk 2ª and the inner main annular-plate 7, though two or more may be used when provided with properly placed keys and keyseats. Three disks, as shown, being in use each is provided in one face with a diametric radial groove or seat 5, and on the other face with a diametrical radial key or tongue 4 at one eighth of the arc of the circle from the opposite groove 5. The inner face of disk 2ª is provided with a diametric tongue 2ᵇ, with which the groove 5 of the disk 3 engages, and the main plate 7 is provided with a diametric radial key 7ª engaging with a groove or seat in the adjacent disk 3ᵇ. The wheel can thus be positively driven from the axle or hub-sleeve. Eight sliding interlocking connections are thus provided and the wheel will slide, during its revolution, into any intermediate position between a radial key in one plate, and a radial key in an adjacent plate, wherever the thrust or pressure is applied.

The spokes 12 are secured at their outer ends to a wooden or other felly 9 in a well known manner. A clamping or gripping band 9ª is secured to the felly and engages the solid tire 10 in the usual manner. The tire is preferably made of specially prepared wood, cut in sections—with the grain or fiber running crosswise. A rubber tread 11 is cut and applied to the face of the tire and secured by means of dove-tail parts so that it will not slip on the wood.

I preferably arrange around the hub-sleeve four segmental pressure blocks 14, having mitered ends 14ᵇ adapted to abut against one another, as shown in Fig. 4, and also having transverse radial grooves or key seats 14ª in their outer faces. These blocks may be made of wood, vulcanized fiber-composition, or other material, with arc-shaped and transversely curved outer edges, forming seats for the outer cushions. Four air bags or cushions 15 of arc shape and made of rubber are secured in place between the outer edges of the blocks 14 and the rim, being spaced apart by four triangular supports and protectors 16. These devices have transverse openings through which are passed tubes 15ª connecting the four air bags together, thus permitting air to flow from one bag to another when subjected to pressure. The triangular supports 16 may be hollow and made of sheet metal and secured to the rim. The opposite sides are spaced apart by tubular sleeves 16ª through which are passed bolts or rivets for holding the sides together. The outer corners of blocks 14 are cut off diagonally as shown in Fig. 4 so as to form spaces between the blocks and the supports 16 in which the air bags may lap under pressure.

An outer cover plate 17, Fig. 2, is preferably secured by rivets to the triangular supports 16. This plate will cover all the parts inside of the rim and keep out dust. The same bolts or rivets which pass through the spacing sleeves 16ª may be used for attaching plate 17. To plate 17 is secured a narrow circular inwardly projecting flange or band 17ª adapted to bear upon the outer faces of the blocks 14, so as to form an annular space into which the air bags 15 may lap when subjected to compression. A similarly inwardly projecting band or flange 7ᵇ is preferably secured to the inner edge of the main annular plate 7 so as to bear upon the opposite faces of the blocks 14. Inside of flange 17ª are four inwardly projecting keys or tongues 18 secured to plate 17 and which engage with the radial seats or grooves 14ª in the radially movable blocks 14 and serve to guide them when pressed against the air cushions.

Having described my invention, what I claim and desire to secure by Letters Patent is—

1. In a resilient wheel, the combination with an inner fixed rim and a hub sleeve, of a series of spaced arc-shaped air cushions bearing on the inner part of the rim and having internal communication with each other; means for holding the air cushions against creeping on said inner part of the rim; a plurality of radially movable blocks arc-shaped at their outer edges and bearing on said connected cushions and having radial key-grooves; an outer cover plate held in rigid engagement with the inner plate and having radial keys or tongues engaging with said grooves; and interlocking sliding members connecting the hub sleeve with the fixed rim, for driving the wheel.

2. In a resilient wheel, the combination with an inner fixed rim and a hub sleeve, of a series of arc-shaped air cushions bearing on the inner part of the rim; means for holding the air cushions from creeping on the inner part of the rim; a plurality of radially movable blocks arc-shaped at their outer edges and bearing on said cushions and having radial key grooves; an outer cover plate held in rigid engagement with the inner plate and having radial keys or tongues engaging with said grooves; and interlocking sliding members connecting the hub-sleeve with the fixed rim, for driving the wheel.

3. In a resilient wheel, the combination with an inner fixed rim and a hub-sleeve, of a series of spaced arc shaped air cushions bearing on the inner part of the rim, protecting supports secured to the rim and extending between the cushions, a plurality of radially movable blocks, arc shaped at their outer edges and bearing on said cushions and having radial key-grooves, an outer cover-plate riveted to the supports on the rim and having radial keys or tongues engaging with said grooves and interlocking sliding members connecting the hub sleeve with the fixed rim, for driving the wheel.

4. In a resilient wheel, the combination with an inner fixed rim and a hub sleeve, of an inner pneumatic tire disposed around the inner periphery of the rim and comprising a series of enlarged sections forming arc-shaped air cushions and an alternate series of reduced sections connecting the enlarged sections together; protecting supports secured to the rim close to the alternate reduced portions of the tire and extending between the enlarged portions thereof to prevent the tire from creeping on the rim; a plurality of radially movable blocks arc-shaped at their outer edges and bearing on said enlarged sections of the pneumatic tire and having radial key-grooves; an outer cover-plate held in rigid engagement with the inner plate and having radial keys or tongues engaging with said grooves; and interlocking sliding members connecting the hub-sleeve with the fixed rim, for driving the wheel.

In testimony whereof I affix my signature in presence of two witnesses.

OLIE BRIZENDINE.

Witnesses:
H. E. BAIRD,
GEORGE G. FLETCHER.

Copies of this patent may be obtained for five cents each, by addressing the "Commissioner of Patents, Washington, D. C."